Nov. 24, 1953   B. M. J. LECLERC   2,660,372
DEVICE FOR COMPARING VALUES REPRESENTED BY PULSES
Filed June 18, 1952
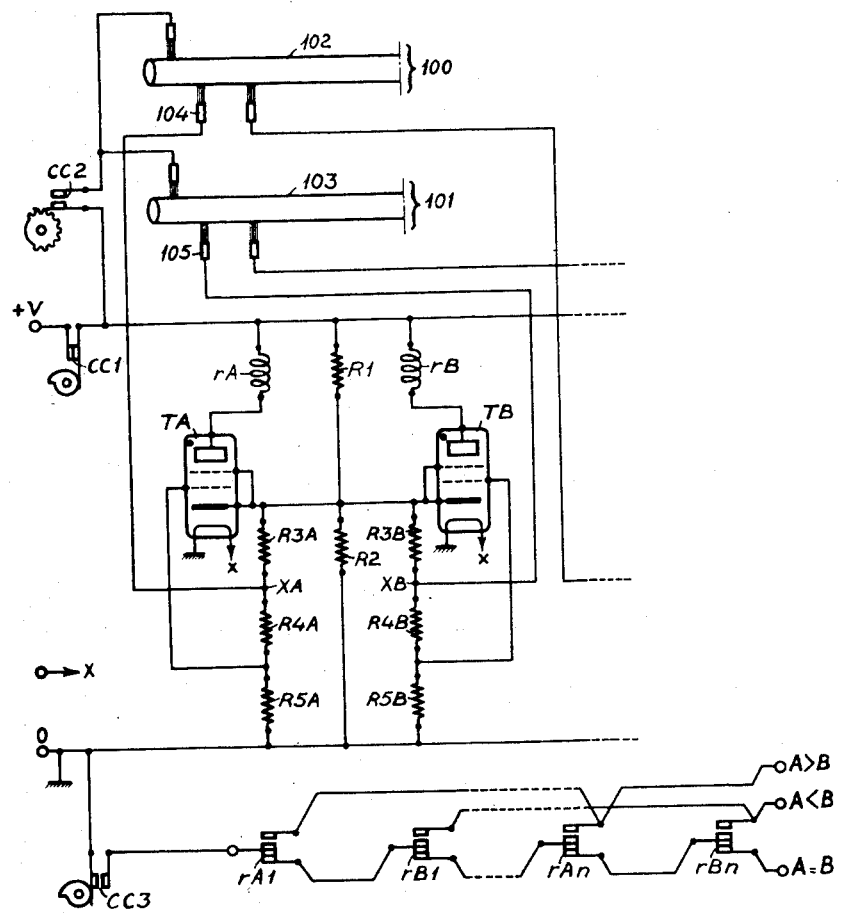

UNITED STATES PATENT OFFICE 2,660,372

DEVICE FOR COMPARING VALUES REPRESENTED BY PULSES

Bruno M. J. Leclerc, Fontenay sous Bois, France, assignor to Compagnie des Machines Bull (Societe Anonyme), Paris, France Application June 18, 1952, Serial No. 294,225

Claims priority, application France July 19, 1951

8 Claims. (Cl. 235—61.7)

The present invention concerns comparison devices used on accounting or statistical machines which make use of record cards.

Usually found on such machines are two stations for analyzing perforated cards, these stations being placed either on a single track for advancing the card, or on two separate tracks. These two analyzing stations are arranged so that during a machine cycle, the front edges of two cards arrive under the scanning brushes at the same time, and consequently, signs or perforations of like value appearing on the two cards being analyzed cause two simultaneous impulses on the respective analyzing circuits. When the signs or perforations are analyzed in decreasing order, that is, 9, 8, 7 . . . 1, 0, the scanning impulses follow each other regularly, in time during the machine cycle, in the same order.

It follows that if in two columns to be compared, belonging respectively to two cards, the perforations are not of equal value, they will cause two successive impulses, the impulse representing the larger value preceding the one which represents the lesser value.

This is well known in the technique of machines using record cards. It is also known that a letter of the alphabet may be represented by two different numerical values in the same column of a card.

The object of the present invention is to provide a device for comparing impulses, these impulses representing, according to how they are distributed in time numerical and/or alphabetical values. This device should be relatively simple and cheap, while at the same time, allowing for the rapid functioning of the machine to which it is adapted.

One object of the invention is a device for comparing impulses, which according to how they are distributed in time, represent numerical and/or alphabetical values. This device is composed of comparison elements, each of which is connected to the analyzing organs of two columns to be compared, and each element including a voltage divider comprising resistors, two gas filled electron tubes (thyratrons for example), each having a load circuit and a control circuit with resistors, said control circuit being common to the control grid and the cathode, each control circuit being connected to an analyzing organ, and so designed that in cases of simultaneous scanning impulses, no thyratron is fired but in cases of non-simultaneous scanning impulses, one thyratron can be fired by the first impulse received during a cycle, by the said comparison element.

Another object of the invention is a device for comparing impulses, composed of comparison elements, each of which may receive two impulses to be compared, and each element including: a tension divider comprising resistors, two gas filled electron tubes (thyratrons for example), of which the cathode voltage is determined at rest by the tension divider, each tube being equipped with a comparison manifesting anode circuit, and a control circuit with resistors for receiving the impulse which is to be compared, each control circuit being connected parallel to a resistor of the voltage divider, and so designed that in the case of non-simultaneous impulses received by an element, the impulse last received cannot fire the corresponding thyratron, because of the cathode voltage developed by the thyratron, which has been previously fired.

Another object of the invention is a comparison device as here above indicated, in which the control circuits are so arranged, in relation to the current feeding sources, that during the perforation scanning, the control grids of the thyratrons are brought to a new voltage by the scanning impulses, whether said impulses be simultaneous or not, and so that in a comparison element, the firing of one of the thyratrons depends upon the relation of the voltages of the cathode of the thyratrons to the voltages of each of the control grids of the thyratrons.

The principles of the invention will be clarified by the following description and the figure annexed and included by way of a non-limitative example, comprising the electric diagram of one form of realization.

The comparison device, which is the object of the invention, may for example be adapted to use in a sorting machine for perforated cards.

In the figure, 100 and 101, represent two analyzing sections, arranged on the same card feed track of the machine. The two analyzing sections are spaced so as to provide the simultaneous scanning of the perforations of equal value of two successive cards in motion.

As is often the case, in perforated card machines, operating by cycles, analysis of the card perforations takes place during the first part of the cycle, while the various other operations such as comparison, and control of subsequent operations, take place during the second part of the same cycle.

Cam contacts CC1, CC2 and CC3 are controlled by cams moving in synchronism with the card feeding organs. Contact CC1 is constantly closed, except for an instant at the end of each cycle, when it opens in order to interrupt the feeding of the electronic tubes of the comparison device.

CC2 constitutes a circuit breaker, which allows cylinders 102 and 103 to be under voltage during only the part of the time of the passage of the card perforations under the brushes. CC3 is closed for an instant towards the end of each cycle, and allows a circuit to be established by one of the terminals, marked $A>B$, $A<B$, or $A=B$.

Since, according to the invention, the discrimination of the simultaneity of the impulses is obtained, by the choice of electronic tubes, of feeding voltages, and of the value of the organs employed, organs of different values and natures may naturally be considered, while still remaining within the scope of the invention. The following precisions may be given, by way of indication:

Each comparison element of which only one is represented in the figure in order not to encumber the diagram needlessly, is comprised of two thyratrons, for example of type 2D.21 (reference characters TA and TB). The voltage provided by the feeding source to terminals $+V$ and O is of approximately 60 volts. The central voltage divider is comprized of two resistors: R1 of 4,700 ohms and R2 of 330 ohms.

Resistors R3A and R3B are of 3,500 ohms.
Resistors R4A and R4B are of 50,000 ohms.
Resistors R5A and R5B are of 10,000 ohms.
The resistance of each relay winding $rA$, $rB$ is of approximately 1,500 ohms.

At rest, that is to say at the beginning of the cycle, CC1 being closed, and CC2 being open, no thyratron is fired (i. e. becomes conducting) because of the voltages applied to the cathodes and control grids by voltage dividers R1, R2 on one hand, and by R3A, R4A, R5A, R3B, R4B and R5B on the other.

Actually, a difference in negative voltage exists at this moment between the cathodes and the control grids (about $-3$ volts for the values here mentioned), which prevents the firing of the thyratrons according to the then present feeding conditions.

If during the analysis of two successive cards, contact CC2 being closed at the passage of each possible perforation, two perforations of equal value in two corresponding columns arrive simultaneously under scanning brushes 104 and 105, it is evident that points XA and XB are at the same time brought to the voltage $+V$.

It follows that the voltage of the control grids is momentarily modified in the positive direction (and brought to $+10$ v. with the values here mentioned). At the same time, as a result of R1 being simultaneously placed in parallel with R3A and R3B, the voltage of the cathodes is also modified in the positive direction. The difference in voltage then existing between the cathodes and the control grids, however, still remains negative (approximately 2.3 v.), and prevents the firing of the thyratrons.

The result that two scanning impulses of equal value have not caused the energization of either relay $rA$ or $rB$ has thus been obtained, therefore permitting control of the machine in a determined manner, at the end of a cycle, when CC3 closes, for example in a known manner to prevent the movement of a deflection flap of the card feeding track. This is actually obtained if none of the alternative contacts $rA1$, $rB1$, $rAn$ or $rBn$ is displaced, therefore permitting the establishment of the partial circuit: Terminal $A=B$, CC3, terminal O.

The case of two scanning impulses applied to the comparison element, when not simultaneous, may now be examined, for example, if a first perforation is read by brush 104. In this case, when point XA is brought to voltage $+V$, the control grid of TA is brought to the same positive voltage ($+10$ v.) as previously (during the two simultaneous impulses), while the cathode of TA assumes a positive voltage ($+8.3$ v.) lower than the voltage of the control grid. This arises from the fact that only resistor R3A is now in parallel with R1. The voltage of the control grid of TA, becoming momentarily positive (by 1.7 v.), in relation to the cathode, TA is found to be in the firing condition, and until the opening of CC1, it starts a current which energizes $rA$.

Before the opening of CC1, and during the closing of CC3, a circuit may be established towards terminal $A>B$, by contact $rA1$ presently changed-over, the machine may therefore be controlled accordingly, and cause for example, the movement of a determined card deflection flap. It is obvious that if the opposite inequality is detected, i. e. in case $A<B$, the machine may be controlled differently by terminal $A<B$.

It is now apposite to point out that when both thyratrons of a comparison element receive two non-simultaneous impulses during a cycle, the impulse last received cannot result in the firing of the thyratron to which it is applied.

Considering, for example, as here stated, that thyratron TA has been started by a first impulse, it is seen that the current, furnished by this thyratron passes for the larger part by way of R2. This current is added to the one normally passing through voltage divider R1, R2 with the result, that when TA is conducting, the cathodes of TA and TB are at a considerably higher voltage than the one applied to the control grids, when the points XA and/or XB are brought to voltage $+V$.

At the moment when TB receives the second scanning impulse, the difference in voltage between the cathode and its control grid remains higher than its starting bias making it impossible for it to fire.

This peculiarity makes possible a very favorable simplification of the comparison circuits.

Only the comparison element assigned to the column of the highest order in a zone to be compared on two cards has been represented. The elements for lower denominational orders should be arranged in a similar manner with the scanning brushes of the corresponding orders.

In cases of comparison of alphabetical indications, there is nothing to prevent extending the principle of comparing impulses representing numerical values to two numerical impulses produced during a same cycle, for the purpose of alphabetical classification. Although only perforated cards have been considered, it is obvious that this device may be adapted to all devices which read any type of record card whatever, by appropriate means.

I claim:

1. In an accounting machine for comparing record cards bearing record marks in index point locations in columns to be compared, two record card feeding tracks each provided with sensing means adapted to the simultaneous sensing of one column to be compared in both record cards, two gas discharge tubes each having a grid input circuit and a plate output circuit, the cathode of both tubes being connected by a connection, each plate circuit comprising an electromagnetical relay and each grid circuit a tapped resistor, one end of which is connected to the earth and the other directly to the cathode of the tube, and also to a source of high potential through a feeding resistor and to the earth through an earthing resistor, said feeding and earthing resistors being common to both tapped resistors, a connection for connecting a tap on one said tapped resistor to its related control grid and another connection for connecting a like tap on the other said tapped resistor to its related control grid, two connections for conveying the impulses derived from said sensing to another tap respectively on each said tapped resistor so as to vary the cathode and grid potentials of the related tubes and obtain according to the presence of the first mark sensed in either column under comparison, or of two simultaneous or zero marks sensed in the two columns under comparison respectively, the firing of only one tube or no firing.

2. A star connected impedance arrangement having at least three arms, two ends of which are earthed and the third one carried to a high potential, two said earthed arms being conditionally connected by a first tap thereon to a source of high voltage by means of connections respectively controlled by means for sensing two registered data, two control units sensitive to a pre-determined operative value of the voltage impressed on their controlling input with respect to the center point of the impedance arrangement, a connection for each of said earthed arms connected by one of its ends to a second tap on same arms and by its other end to said input of a respective control unit, the values of the impedances being so chosen as to produce operative voltages that operate only one of said control units if one first tap only is actually connected to said source of high voltage.

3. A four arm, star-connected impedance arrangement, three arms of which are earthed and the fourth one connected to a source of high voltage, two of said earthed arms being temporarily connected by first taps thereon to said source of voltage through perforations in corresponding moving record cards, two control units sensitive to a predetermined operative value of the voltage impressed on their controlling input with respect to the center point of the impedance arrangement, a connection, for each of said two earthed arms, connected by one of its ends to a second tap on same arms and by its other end to said input of a respective said control unit, the values of the impedances being so chosen as to produce operative voltages that only operate one and only one of said control units if one first tap only at a time is actually connected to said source of high voltage.

4. Comparing device of an accounting machine cyclically operated and controlled by record cards bearing record marks in index point locations, comprising a number of comparison elements, each of which is connected to two sensing organs of the machine respectively sensing a card column in both cards to be compared and includes in combination: a voltage divider composed of resistors, two gas discharge tubes each having a load circuit and a control circuit with resistors, connections for connecting the latter circuit to the cathode and to the control grid of each tube, each comparison element being connected to its related sensing organs by its control circuits the resistance values of which are so determined that in case of simultaneous voltages applied on both control circuits and resulting from simultaneous impulses delivered by both corresponding sensing organs, no tube is fired whereas in the case of non-simultaneous impulses one tube is fired by the first impulse received during a cycle.

5. Comparing device of an accounting machine cyclically operated and controlled by record cards bearing record marks in index point locations, comprising a number of comparison elements, each of which is adapted for receiving two impulses to be compared, each element including in combination: a voltage divider composed of resistors, two gas discharge tubes, connections for connecting the cathode of each tube to the voltage divider so as to determine the cathode voltage, comparison manifesting means in the anode circuit of each tube, and a control circuit composed of two paralleled series of resistors, each series connected to the cathode and control grid of one of said tubes and also connected so as to receive one of said two impulses to be compared, the resistance values of each series being so determined that in case of no impulse or simultaneous impulses received by the corresponding comparison element no tube is fired, whereas in case of non-simultaneous impulses or a single impulse received by said comparison element only the tube which receives the first impulse or the single impulse is fired by said impulse.

6. An electrical comparing device for comparing a pair of designation data represented by timed pulses, said comparing device comprising a direct current supplying source, a common voltage divider connected across said source, two gas discharge tubes each including an anode connected to the plus side terminal of said source, a cathode and a control grid, both cathodes being connected to one tap on said common voltage divider, two separate voltage dividers connected across the minus side resistor of said common voltage divider, each separate voltage divider being provided with one tap connected to one pulse producing sensing device and another tap connected to the control grid of one tube, said connections applying potentials to the tubes, which at rest results in a non-firing condition for both tubes, the values of the resistors in said voltage dividers being related to the voltages applied to the tube electrodes in such a manner that, in case of simultaneous sensing pulses no tube is fired, and in case of non-simultaneous sensing pulses, only the tube associated with the separate voltage divider receiving the first sensing pulse is fired.

7. An electrical comparing device for comparing differentially located holes representing data recorded on cards or the like, said comparing device comprising a direct current supplying source, a common voltage divider connected across said source, two gas discharge tubes each including an anode, a cathode and a control grid, both cathodes being connected to one tap on said common voltage divider, two work relays inserted each in the anode circuit of one of said tubes, two separate voltage dividers connected across the resistor on the minus side of said common voltage divider, each separate voltage divider being provided with one tap which may be connected to the plus side of said source by an associated sensing device through a sensed hole and with another tap at which the control grid of an associated tube is connected to establish at rest a non firing condition, the values of the resistors of said voltage dividers being related to the voltage of said source in such a manner that no tube is fired when two holes are concurrently sensed and that, in the event of two compared holes being non-simultaneously sensed, only the tube corresponding to the first hole sensed is fired and energizes its work relay.

8. Electrical comparison element for comparing impulses given by an accounting machine or the like, the value of said impulses depending on their timed positions in the machine cycle, said element comprising two input circuits each of which is attributed to one of the impulses to be compared and controls the control grid of a gas discharge tube, two output circuits each controlling a corresponding utilization organ, a common voltage divider connected to the cathodes of both tubes, two voltage dividers each connected to the control grid and cathode of the respective tube, the arrangements of said voltage dividers determining the voltage values of the cathode and control grid of each tube so that in the case of no impulse or two simultaneous impulses both utilization organs are not operated, whereas in the case of non simultaneous impulses or a single impulse only the utilization organ corresponding to the tube which receives the first impulse or the single impulse is operated.

BRUNO M. J. LECLERC.

No references cited.